United States Patent [19]

Taga

[11] Patent Number: 4,618,053

[45] Date of Patent: Oct. 21, 1986

[54] MECHANISM FOR DELIVERING FASTENER ELEMENTS TO FASTENER-ASSEMBLING APPARATUS

[75] Inventor: Yukio Taga, Uozu, Japan

[73] Assignee: Nippon Notion Kogyo Co., Ltd., Tokyo, Japan

[21] Appl. No.: 687,012

[22] Filed: Dec. 28, 1984

[30] Foreign Application Priority Data

Dec. 29, 1983 [JP] Japan .................. 58-200492

[51] Int. Cl.$^4$ .................. B65G 47/24; B65G 47/44
[52] U.S. Cl. .................. 198/389; 221/165; 221/116; 198/448
[58] Field of Search .................. 198/389, 420, 448; 29/771, 786; 221/116, 165, 180

[56] References Cited

U.S. PATENT DOCUMENTS

| | | | |
|---|---|---|---|
| 1,132,988 | 3/1915 | Wade | 221/165 |
| 1,204,067 | 11/1916 | Richardson | 221/165 |
| 2,155,568 | 4/1939 | Standish et al. | 221/165 |
| 2,803,274 | 8/1957 | Zubal et al. | 221/165 |
| 2,966,739 | 1/1961 | Kalbow | 29/771 |

FOREIGN PATENT DOCUMENTS

| | | | |
|---|---|---|---|
| 448415 | 8/1927 | Fed. Rep. of Germany | 221/165 |
| 3047 | of 1857 | United Kingdom | 221/165 |
| 29117 | of 1909 | United Kingdom | 221/116 |

*Primary Examiner*—Joseph E. Valenza
*Assistant Examiner*—Daniel R. Alexander
*Attorney, Agent, or Firm*—Hill, Van Santen, Steadman & Simpson

[57] ABSTRACT

A mechanism, for delivering two different kinds of fastener elements to a fastener-assembling apparatus, comprises a pair of hoppers for containing the two different fastener elements separately, and a pair of pick-up plates pivotally and vertically movable in the respective hoppers for picking up the fastener elements therein to deliver the same to a pair of separate chutes. The two pick-up plates are driven by a single drive, such as an air-cylinder or oil-cylinder.

2 Claims, 11 Drawing Figures

MECHANISM FOR DELIVERING FASTENER ELEMENTS TO FASTENER-ASSEMBLING APPARATUS

BACKGROUND OF THE INVENTION

1. Field of the Invention

The present invention relates to an apparatus for assembling a pair of different fastener elements of a garment fastener, such as a snap fastener, a button or an ornament, and more particularly to a mechanism for delivering such two different kinds of fastener elements to the fastener-assembling apparatus separately through a pair of chutes.

2. Prior Art

Various mechanisms for the purpose described above are known which generally include a pair of separate feeders for containing two kinds of fastener elements separately, each feeder comprising a rotary drum of a reverted frustoconical shape. The frustoconical drum has in its lower inside edge a plurality of grooves spaced at equal intervals therealong for receiving the fastener elements. In response to rotation of each drum, the fastener elements therein are delivered successively to a respective chute leading to the fastener-assembling apparatus.

However, a common problem with the known mechanisms is that because the two feeder drums are driven by a single drive, high-speed delivery of two different kinds of fastener elements without impairing the same is difficult to achieve if the fastener elements of each kind have a different mechanical strength. If the two feeder drums were driven at the rate of rotation which is suitable for the mechanically weak fastener elements, only a low-speed delivery could be achieved. To the contrary, if the two feeder drums were driven at the rate of rotation which is suitable for the mechanically strong fastener elements, the mechanically weak fastener elements could be easily deformed or otherwise damaged.

SUMMARY OF THE INVENTION

According to the present invention, a mechanism, for delivering two different kinds of fastener elements to a fastener-assembling apparatus, comprises a pair of hoppers for containing the two different fastener elements separately, and a pair of pick-up plates pivotally and vertically movable in the respective hoppers for picking up the fastener elements therein to deliver the same to the respective upper mouths of a pair of separate chutes. The two pick-up plates are driven by a single drive, such as an air-cylinder or oil-cylinder.

It is therefore an object of the present invention to provide a mechanism for delivering two different kinds of fastener elements separately to a fastener-assembling apparatus at an improved rate without the risk of impairing the fastener elements of either kind.

Many other advantages, features and additional objects of the present invention will become manifest to those versed in the art upon making reference to the detailed description and the accompanying drawings in which a preferred embodiment incorporating the principles of the present invention are shown by way of illustrative example.

DETAILED DESCRIPTION

Figure 1:
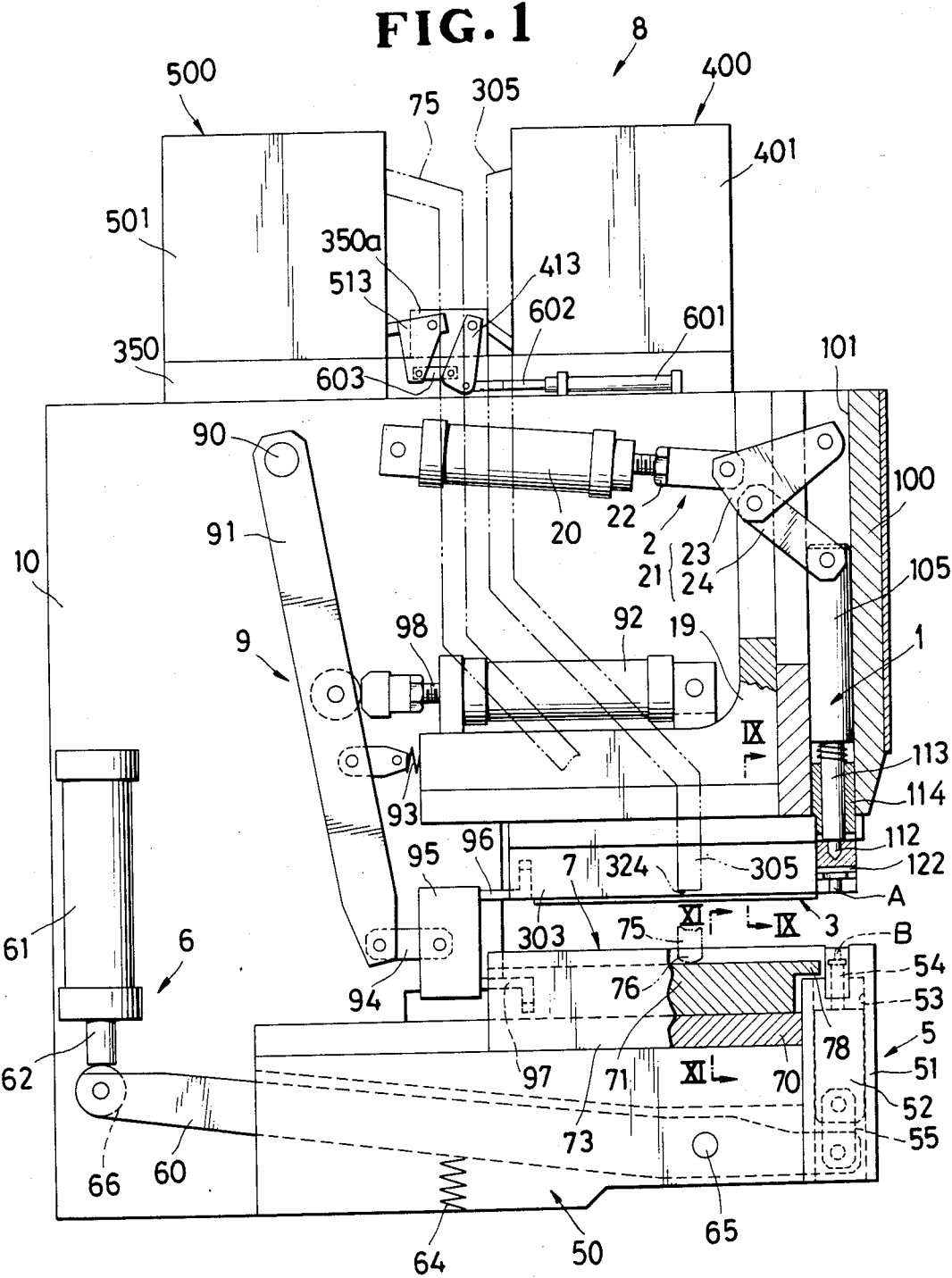
FIG. 1 is a side elevational view, with parts broken away, of a fastener-assembling apparatus having a fastener-delivering mechanism embodying the present invention.

FIG. 1 shows a fastener-assembling apparatus for joining a pair of first and second fastener elements A, B (one illustrated in phantom lines) together, with or without a garment fabric C (not shown) disposed therebetween. In the illustrated embodiment, the first and second fastener elements A, B comprise a button and a tack, respectively. As best shown in FIGS. 4–7, the button A has a head A2 and a hollow shank A1 projecting centrally therefrom, while the tack B has a head B2 and a spike B1 projecting centrally therefrom for piercing through the garment fabric (not shown) and also for being inserted through the hollow shank A1 of the button A.

The fastener-assembling apparatus comprises an upper or punch unit 1, a first drive mechanism 2 for vertically moving a punch 112 of the upper unit 1, a first pusher mechanism 3 for receiving a button A from a first feeder 400 and for supplying the button A to the upper unit 1, a lower or die unit 5, a second drive mechanism 6 for vertically moving a die 54 of the lower unit 5, and a second pusher mechanism 7 for receiving a tack B from a second feeder 500 and for supplying the tack B to the lower unit 5. The first and second pusher mechanisms 3, 7 are driven in timed relation to each other by a third drive mechanism 9.

The apparatus also includes a mechanism 8 for delivering a succession of the button A and a succession of tacks B to the first pusher mechanism 3 and the second pusher mechanism 7 concurrently and separately.

The upper unit 1 includes a guide 100 fixed to a support 19 and having a first vertical channel 101, and an upper plunger 105 reciprocable vertically within the first vertical channel 101 in the guide 100, the support 19 being fixed to a frame 10.

The upper plunger 105 is operatively connected at its upper end to the first drive mechanism 2 for vertical reciprocating movements toward and away from the lower unit 5. At its lower end, the plunger 105 has a coaxial head 113 vertically slidably supported by a first support block 114 which is in turn vertically slidably received in the first vertical channel 101 in the guide 100. The punch 112 is fixed to the lower end of the plunger head 113.

Figure 8:
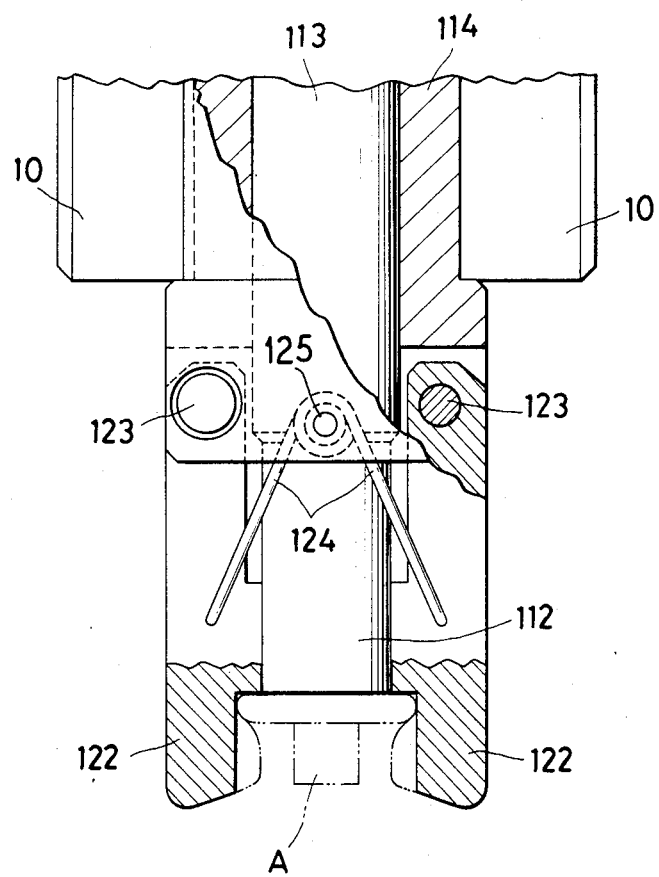
FIG. 8 is an enlarged front view, with parts broken away, of an upper unit of FIG. 1.

As better shown in FIG. 8, the support block 114 has in its lower end a pair of clamp members 122, 122 pivotally mounted thereon by a pair of pins 123, 123, respectively. A torsion spring 124 is supported on the support block 114 by a pin 125 and acts on the clamp members 122, 122 to normally urge the latter toward each other for clamping a button A therebetween. Such inward movements of the clamp members 122, 122 under the biasing force of the torsion spring 124 are restricted by the punch 112 so that, in the absence of a button A between the clamp members 122, 122, the distance therebetween is smaller than the diameter of the head A2 of the button A. When a button A is supplied into the space between the clamp members 122, 122 by the first pusher mechanism 3, the head A2 of the button A pushes the clamp members 122, 122 away from each other against the bias of the torsion spring 124 until the button A is placed between the clamp members 122, 122. The button A thus clamped between the clamp members 122, 122 is lowered by the first drive mechanism 2 to a lower position where the button A is joined with a mating tack B by the die 54 and the punch 112.

The first drive mechanism 2, as shown in FIG. 1, includes an air cylinder 20 and a first toggle joint 21 composed of a pair of first and second levers 23, 24, the air cylinder 20 being pivotally supported on the frame 10. The first lever 23 is pivotally secured at one end thereof to the guide 100 and is pivotally connected at the other end to a piston rod 20 of the air cylinder 22, while the second lever 24 is pivotally connected at opposite ends to the second lever 23 and the plunger 105. In response to reciprocating movement of the piston rod 22, the first and second levers 23, 24 are pivotally moved relative to each other between a first position in which the two levers 23, 24 are disposed substantially at a right angle to one another, and a second position in which the two levers 23, 24 are disposed substantially in a vertical straight line. Thus while the two levers 23, 24 are moved between the first and second positions, the plunger 105 is moved vertically.

Figure 9:
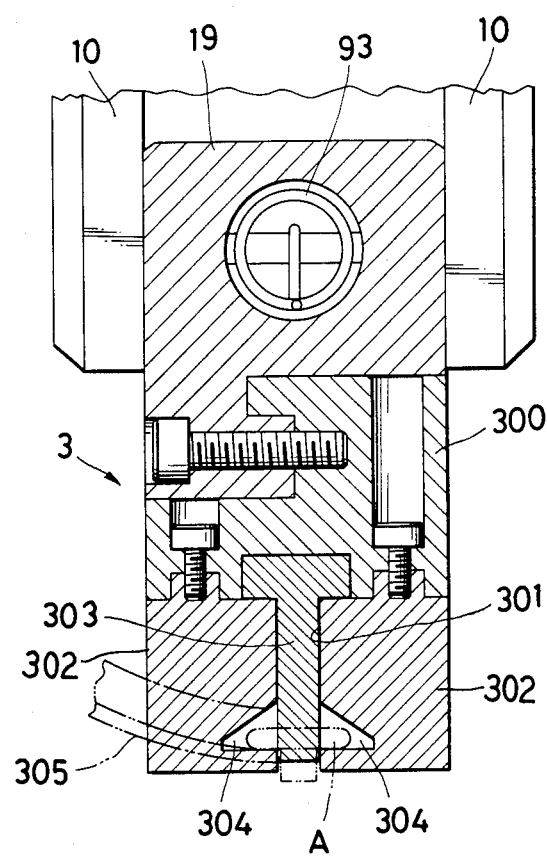
FIG. 9 is an enlarged cross-sectional view taken along line IX—IX of FIG. 1.

As shown in FIGS. 1 and 9, the first pusher mechanism 3 includes a first elongated guide base 300 secured to the under side of the support 19, and a pair of parallel guide plates 302, 302 secured to the under side of the guide base 300. The first guide base 300 and the two guide plates 302, 302 jointly define a first longitudinal guide channel 301 of a T-shaped cross section, in which a first elongated pusher 303 of a T-shaped cross section is slidably received. The two guide plates 302, 302 have in their inner surfaces a pair of grooves 304, 304 for guiding the head A2 of a button A.

Figure 2:
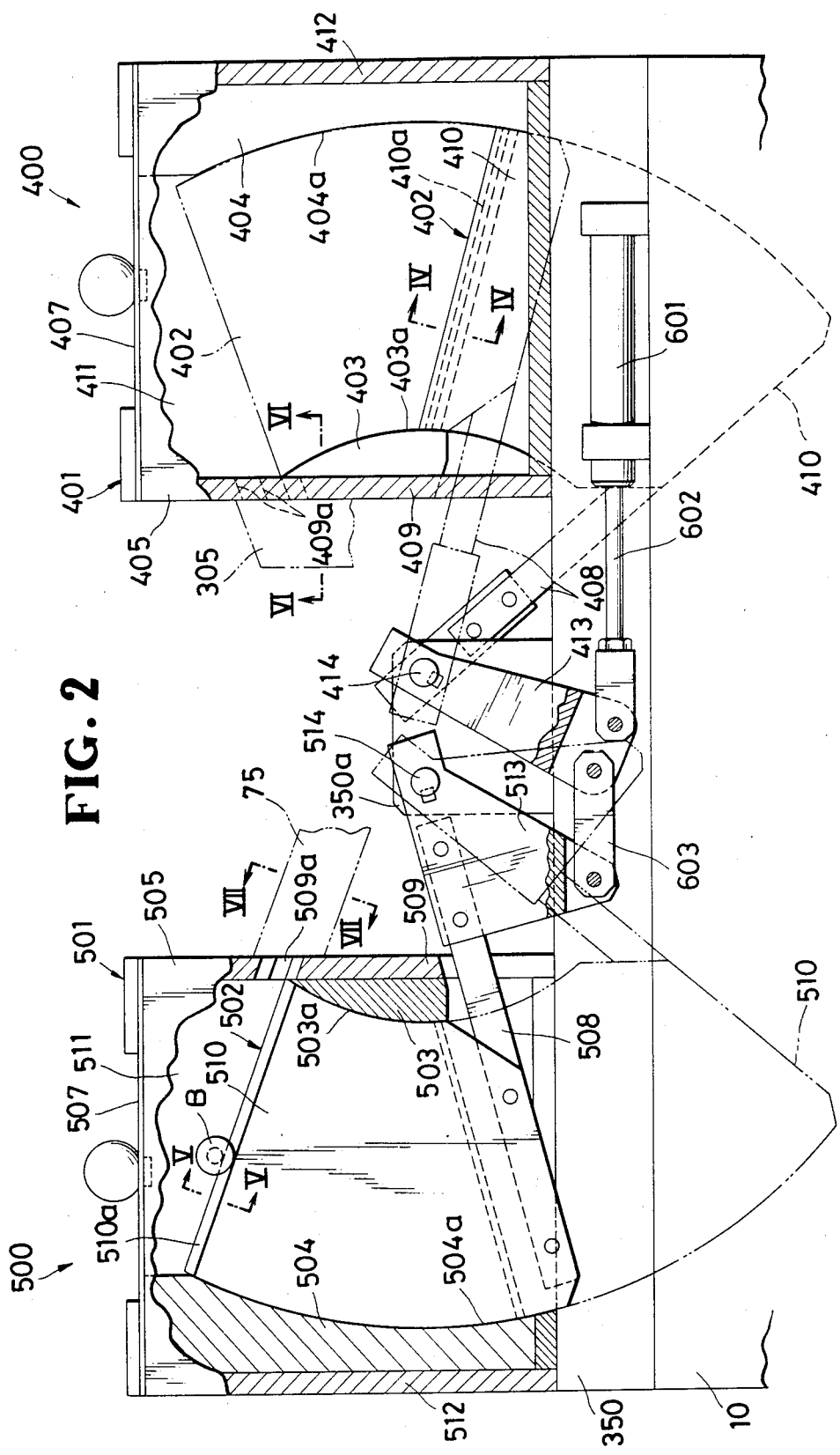
FIG. 2 is an enlarged front elevational view, with parts broken away, of the fastener-delivering mechanism of FIG. 1.
Figure 3:
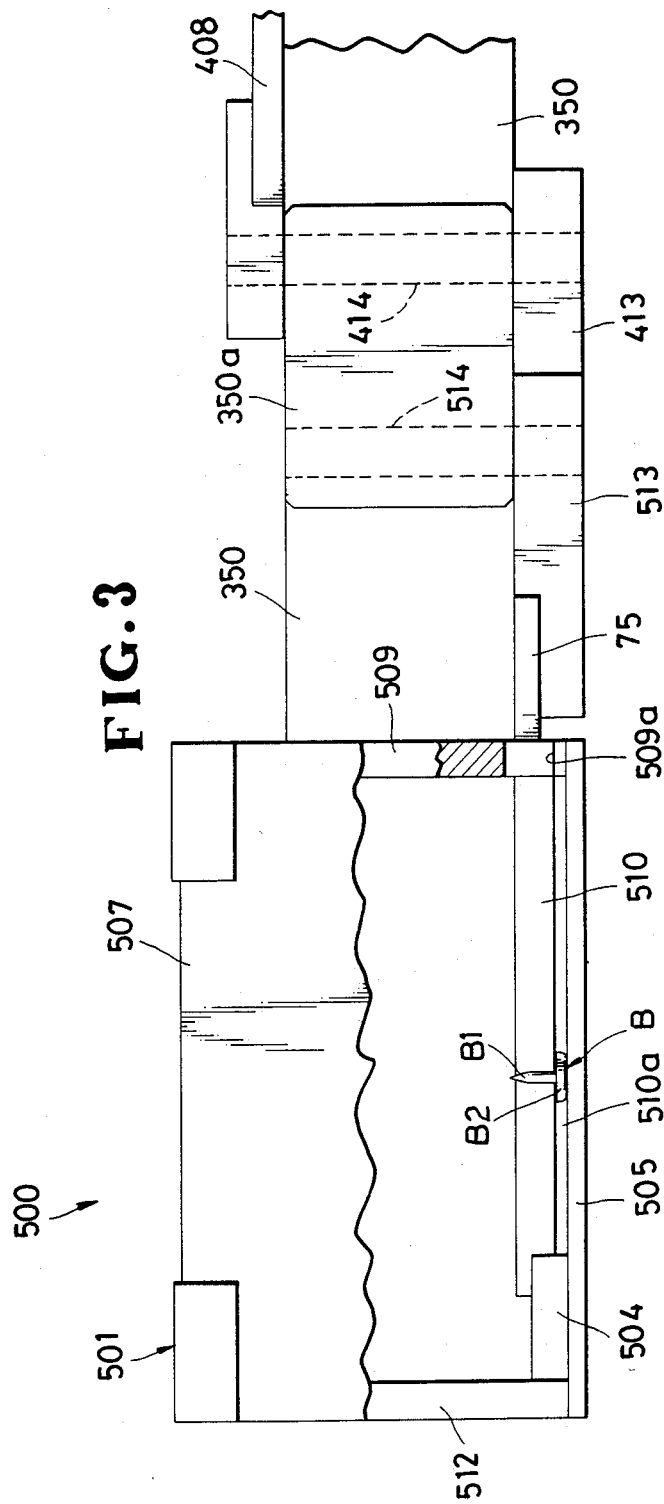
FIG. 3 is an enlarged plan view, with parts broken away, of the fastener-delivering mechanism of FIG. 1.

As shown in FIGS. 2 and 3, the fastener-delivering mechanism 8 comprises a first parts-feeder 400 for delivering the buttons A successively to a first chute 305, and a second parts-feeder 500 for delivering the tacks B successively to a second chute 75, the first and second parts-feeders 400, 500 being mounted on a base 350 fixed to the frame 10. The first parts-feeder 400 includes a first hopper 401 for containing a large number of buttons A, and a first pick-up 402 pivotally and vertically movable in the first hopper 401 for picking up the buttons A therein to discharge the same to the first chute 305. Likewise, the second parts-feeder 500 includes a second hopper 501 for containing a large number of tacks B, and a second pick-up 502 for picking up the tacks B therein to discharge the same to the second chute 75. The first and second hoppers 401, 501 are spaced apart from each other along the base 305.

Each of the first and second hoppers 401, 501 is in the form of a box having a pair of inner and outer flat vertical walls 409, 412; 509, 512 and a pair of flat vertical side walls 405, 411; 505, 511. A pair of guide members 403, 404; 503, 504 is mounted on the inside surface of one side wall 411, 511 parallel to the frame 10. One of the guide members 403, 503 has a convex guide surface 403a, 503a, while the other guide member 404, 504 has a concave guide surface 404a, 504a. The top opening of each hopper 401, 501 is covered by a closure 407, 507.

Figure 4:
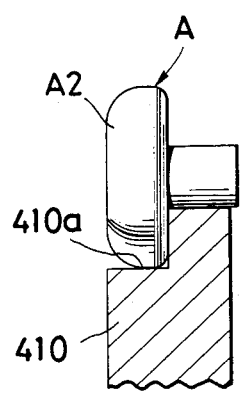
FIG. 4 is an enlarged cross-sectional view taken along line IV—IV of FIG. 2.

The first pick-up 402 includes a first arm 408 pivotable on a projection 350a of the base 350 and extending into the first hopper 401 through the inner wall 409 thereof, and a first fan-shaped plate 410 fixed to a free end portion of the first arm 408. The first arm 408 is fixed to a fifth lever 413 pivotally supported on the projection 350a by a pin 414. The projection 350a is disposed centrally between the first and second hoppers 401, 501, as shown in FIGS. 1 and 2. The first fan-shaped plate 410 has along its upper edge a first stepped portion 410a extending through the entire length of the first fan-shaped plate length of the first fan-shaped plate 410 so as to define with one side wall 411 a groove partially receptive of the head A2 of the individual button A. In response to upward pivotal movement of the first fan-shaped plate 410, a button A picked up thereby rolls on the upper edge of the first fan-shaped plate 410 with the head A2 of the button A received in the first stepped portion 410a, as shown in FIG. 4.

Figure 5:
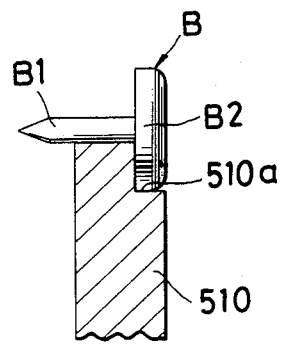
FIG. 5 is an enlarged cross-sectional view taken along line V—V of FIG. 2.

Similarly, the second pick-up 502 includes a second arm 508 pivotable on the projection 350 and extending into the second hopper 501 through the inner wall 509 thereof, and a second fan-shaped plate 510 fixed to a free end portion of the second arm 508. The second arm 508 is fixed to a sixth lever 513 pivotally supported on the projection 350a by a pin 514. the second fan-shaped plate 510 has along its upper edge a second stepped portion 510a extending through the entire length of the second fan-shaped plate 510 so as to define with one side wall 511 a groove partially receptive of the head B2 of the individual tack B, as better shown in FIG. 3. In response to upward pivotal movement of the second fan-shaped plate 510, a tack B picked up thereby rolls on the upper edge of the second fan-shaped plate 510 with the head B2 of the tack B received in the second stepped portion 510a, as shown in FIG. 5.

As shown in FIG. 2, the inner wall 409 of the first hopper 401 has in its upper portion a first opening 409a of a cross-sectional shape substantially corresponding to the contour of a button A, while the inner wall 509 of the second hopper 501 has in its upper portion a second opening 509a of a cross-sectional shape substantially corresponding to the contour of a tack B. The first and second openings 409a, 509a communicate with the first and second chutes 305, 75, respectively.

The first fan-shaped plate 410 is vertically movable, in response to pivotal movement of the fifth lever 413, between a lowered position in which the first stepped portion 410a is disposed near the bottom of the first hopper 401 to pick up a certain number of buttons A, and a raised position in which the first stepped portion 410a is aligned with the first opening 409a in the inner wall 409 to discharge the picked-up buttons A one after another from the first opening 409a into the first chute 305.

Meanwhile, the second fan-shaped plate 510 is vertically movable, in response to pivotal movement of the sixth lever 513, between a lowered position in which the second stepped portion 510a is disposed near the bottom of the second hopper 501 to pick up a certain number of tacks B, and a raised position in which the second stepped portion 510a is aligned with the second opening 509a in the inner wall 509 to discharge the picked-up tacks B one after another from the second opening 509a into the second chute 75.

Figure 6:
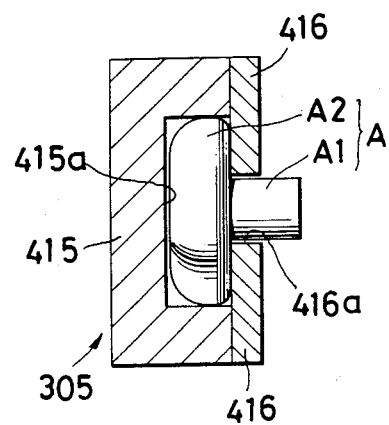
FIG. 6 is an enlarged cross-sectional view taken along line VI—VI of FIG. 2.

As shown in FIG. 6, the first chute 305 includes a first parts-guide 415 defining along its entire length a guide groove 415a loosely receptive of the head A2 of a button A, and a first cover 416 coextending with the first parts-guide 415 to cover the guide groove 415a. The first cover 416 has along its entire length the guide groove 415a for loosely receiving the shank A1 of a button A. The individual button A discharged into the first chute 305 rolls downwardly, by its own weight on the first parts-guide 415 and the first cover 416.

Figure 7:
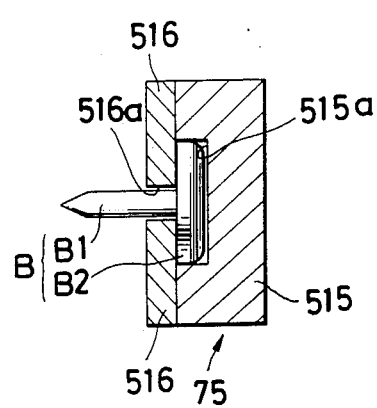
FIG. 7 is an enlarged cross-sectional view taken along line VII—VII of FIG. 2.

As shown in FIG. 7, the second chute 75 includes a second parts-guide 515 defining along its entire length a guide groove 515a loosely receptive of the head B2 of a tack B, and a second cover 516 coextending with the second parts-guide 515 to cover the guide groove 515a. The second cover 516 has along its entire length a slot 516a communicating with the guide groove 515a for loosely receving the shank B1 of a tack B. The individual tack B discharged into the second chute 75 rolls downwardly, by its own weight, on the second parts-guide 515 and the second cover 516.

As shown in FIGS. 1 and 2, the fifth and sixth levers 413, 513 are interconnected at their free ends by a link 603 and are driven in timed relation to each other by a fourth air cylinder 601 supported on the base 350. A piston rod 602 of the fourth air cyliner 601 is pivotally connected to the free end of the fifth lever 413.

In FIGS. 1 and 2, the piston rod 602 of the air cylinder 601 is fully extended, and the first fan-shaped plate 410 is disposed in its lowered position in which the first stepped portion 410a is disposed near the bottom of the first hopper 401 to pick up a certain number of fresh buttons A. To the contrary, the second fan-shaped plate 510 is disposed in its raised position in which the second stepped portion 510a is aligned with the second opening 509a in the second hopper's inner wall 509 to discharge the picked-up tacks B one after another from the second opening 509a into the second chute 75. Then when the piston rod 602 of the fourth air cylinder 601 is retracted, the fifth lever 413 pivots counterclockwise to thereby cause the first fan-shaped plate 410 to be pivotally moved along the inner and outer guides 403, 404 to its raised position (phantom lines in FIG. 2) in which the first stepped portion 410a is aligned with the first opening 409a in the first hopper's inner wall 409 to discharge the picked-up buttons A one after another from the first opening 409a into the first chute 305. During that time the sixth lever 513 pivots counterclockwise from the solid-line position to the phantom-line position to thereby cause the second fan-shaped plate 410 to be pivotally moved along the inner and outer guides 503, 504 to its lowered position (phantom lines in FIG. 2) to pick up a certain number of fresh tacks B.

As shown FIG. 2, the first and second stepped portions 410a, 510a of the first and second fan-shaped plates 410, 510 are alway angularly spaced apart from each other substantially at an angle of 180°, irrespective of the position of the fourth air cylinder's piston rod 602. Further, the pin 414 is the common center of the curvatures of the convex and concave guide surfaces 403a, 404a (of the first hopper 401), while the pin 514 is the common center of the curvatures of the convex concave guide surfaces 503a, 504a (of the second hopper 501).

A succession of the buttons A is delivered from the first feeder 4 to the junction 324 via the first chute 305. While the forward end of the first pusher 303 is disposed forwardly (rightwardly) of the junction 324, a leading one of the successive buttons A having reached the junction 324 is prevented from entering the groove 304. When the forward end of the pusher 303 is disposed behind the junction 324 as the pusher 303 is fully retracted, the leading button A slides into the groove 304 in front of the pusher's forward end. Then the leading button A is pushed forwardly along the groove 304 by the pusher 303 as the latter is moved forwardly, during which time entering of the succeeding buttons A into the junction 324 is prevented by the projected pusher 303. Thus the successive buttons A are supplied one at a time to the upper unit 1.

As shown in FIGS. 1 and 9, the lower unit 5 includes a base 50 fixedly supported by the frame 10, a second support block 51 fixed to the base 50, and a lower plunger 52 reciprocable vertically within a third vertical channel 53 in the support block 51. A die 54 is fixed to the upper end of the lower plunger 52. The lower plunger 52 is operatively connected to the second drive mechanism 6.

The second drive mechanism 6 (FIG. 1) includes a third lever 60 pivotally supported on the frame 10 by means of a pin 65, a second air cylinder 61 fixed to the frame 10, and a roller 66 rotatably mounted on one end of the third lever 60. The other end of the third lever 60 is connected to the lower end of the lower plunger 52 via a link 55. The third lever 60 is normally urged by a compression spring 64 to pivot clockwise in such a manner that the roller 66 on the left end of the third lever 60 pushes the piston rod 62 of the second air cylinder 61 upwardly to its retracted position and also in such a manner that the right end of the third lever 60 pulls the lower plunger 52 and thus the die 54 to its lowered position via the link 55. When the piston rod 62 of the second air cylinder 61 is actuated to push the roller 66 on the left end of the third lever 60 downwardly via the shock absorber 63, the third lever 60 is pivotally moved counterclockwise to raise the lower plunger 52 and the die 54.

Figure 11:
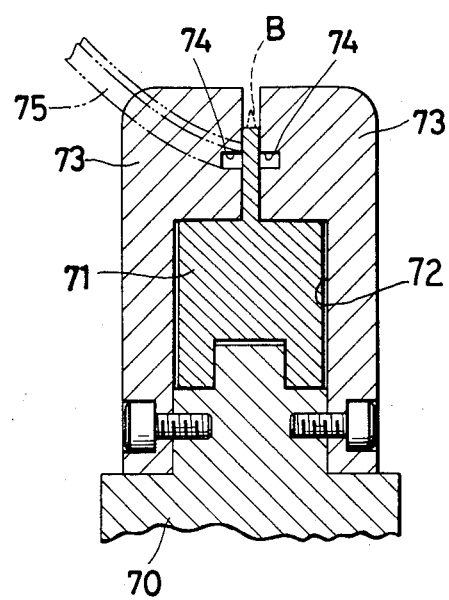
FIG. 11 is an enlarged cross-sectional view taken along line XI—XI of FIG. 1.

As shown in FIGS. 1 and 11, the second pusher mechanism 7 includes a second elongated guide base 70 fixedly supported by the frame 10, a pair of parallel guide plates 73, 73 secured to the upper side of the guide base 70 so as to define therebetween a second longitudinal guide channel 72, and a second elongated pusher 71 slidably received in the guide channel 72. The two guides plates 73, 73 have in their inner surfaces a pair of grooves 74, 74 for guiding the head B2 of a tack B. The second chute 75, for delivering the successive tacks B to the second pusher mechanism 7, has a lower end portion extending through one of the guide plates 73 and communicates with the corresponding groove 74 at the junction 76 (FIG. 1). The second pusher 71 has a forward end 78; in response to the reciprocating movement of the second pusher 71, the forward end 78 is moved between a rear position behind the junction 76 and a forward position in which a tack B is placed onto the die 54.

The first pusher mechanism 3 and the second pusher mechanism 7 are driven in timed relation to each other by the third drive mechanism 9 (FIG. 1). The third drive mechanism 9 includes a fourth lever 91 having an upper end pivotally supported on the frame 10 by means of a pin 90, a third air cylinder 92 fixed to the support 19 for causing the fourth lever 91 to pivot, an extension spring 93 acting between the support 19 and the fourth lever 91 to normally urge the latter toward the third air cylinder 92, and a pushing block 95 connected to a lower end of the fourth lever 91 via a link 94. The first pusher 303 of the first pusher mechanism 3 is connected to the pushing block 95 by a first connector 96, while the second pusher 71 of the second pusher mechanism 7 is connected to the pushing block 95 by a second connector 97.

The piston rod 98 of the third air cylinder 92 is normally retracted so that the first and second pushers 303, 71 normally assume their advanced position under the bias of the extension spring 93. Then as the piston rod 98 of the third air cylinder 92 projects, the fourth lever 91 pivots clockwise in FIG. 1 about the pin 90 to cause the first and second pushers 303, 71 to be moved to their retracted position, thus allowing a succeeding button A and a succeeding tack B to be delivered into the guide channels 301, 72 in front of the first and second pushers 303, 71, respectively.

Figure 10:
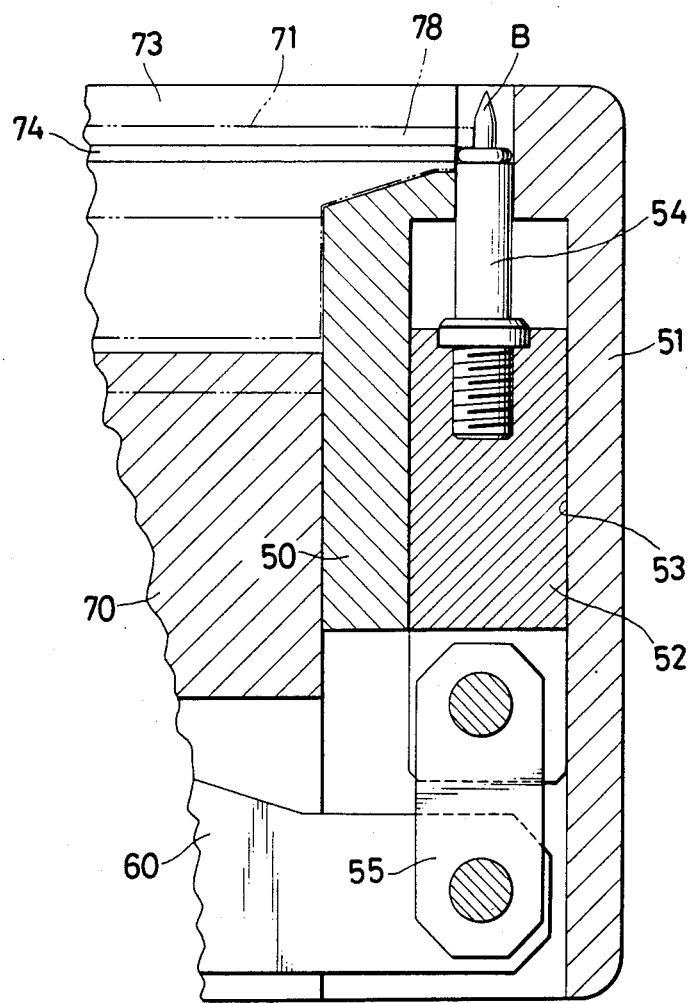
FIG. 10 is a fragmentary enlarged cross-sectional view of a lower unit of FIG. 1.

With the piston rods 22, 62, 98 of the first, second and third air cylinders 20, 61, 92 retracted, when the third air cylinder 92 is de-energized, the fourth lever 91 pivots counterclockwise (FIG. 1) to cause the first and second pushers 303, 71 to be moved to their advanced position. During that time, the first pusher 303 pushes a button A forwardly through the first guide channel 301 (FIG. 9) until the button A is clamped between the clamp members 122, 122 (FIG. 8) in the upper unit 1, while the second pusher 71 pushes a tack B forwardly through the second guide channel 72 (FIGS. 10 and 11) until the tack B is placed on the die 54 in the lower unit 5.

As shown in FIG. 1, the first and second levers 23, 24 of the toggle joint 21 assume a dogleg shape. When the first air cylinder 20 is energized, the first and second levers 23, 24 begin to become extended, thus causing the upper plunger 105 to be moved downwardly. The punch 105 is thereby moved downwardly to contact a button A clamped between the clamp members 122, 122.

The lowering of the upper plunger 105 is continued until the toggle joint 21 becomes fully extended, i.e. the first and second levers 23, 24 are vertically lined up, at which time the lower end surfaces of the clamp members 122, 122 are in contact with a garment fabric C placed over the tack B.

Upon the full extension of the toggle joint 21, the first air cylinder 20 is temporarily de-energized and remains in this position. Subsequently, as the second air cylinder 61 is energized, the piston rod 62 projects to downwardly push the roller 66 on the rear end of the third lever 60 via the shock absorber 63, thus causing the third lever 60 to pivot counterclockwise in FIG. 1. The lower plunger 52 and thus the die 54 are thereby moved upwardly, with the tack B placed on the die 54 (with the spike B1 directed upwardly). As a result, the spike B1 of the tack B pierces through a garment fabric (not shown) and is then inserted through the shank A1 of the button A, and the distal end of the spike B1 is finally deformed so as to join the tack B and the button A together, thus attaching the latter to the garment fabric.

Upon completion of the attaching operation of the button A, the piston rods 22, 62, 98 of the first, second and third air cylinders 20, 61, 92 are returned to their original positions in timed relation to one another so that the punch 112 and the die 54 are retracted away from each other. Thereafter, the first and second pushers 303, 71 are moved forwardly to supply a succeeding button A and a succeeding tack B to the upper unit 1 and the lower unit 5, respectively, for a subsequent attaching operation.

As discussed above, the first pick-up 402 is moved upwardly while the second pick-up 502 is moved downwardly and vice versa. With this arrangement, it is possible to upwardly move one pick-up 402, 502 at a speed different from the speed of upward movement of the other pick-up 502, 402 by making the projecting speed and the retracting speed of the fourth air cylinder's piston rod 602 different from each other. For instance, if the tacks B are mechanically stonger than the buttons A, it is suitable for the first pick-up 402 to be upwardly moved at a speed higher than the speed of upward movement of the second pick-up 502, thus enabling adequately high-speed delivering of the buttons A and the tacks B without the risk of impairing either kind of fastener elements.

Although various minor modifications may be suggested by those versed in the art, it should be understood that I wish to embody within the scope of the patent warranted thereon, all such embodiments as reasonably and properly come within the scope of my contribution to the art.

What is claimed is:

1. A mechanism for successively delivering two different kinds of fastener elements separately to a fastener-assembling apparatus, comprising:
   (a) a base having an upwardly directed projection;
   (b) a pair of first and second hoppers supported on said base for containing the two different kinds of fastener elements separately, said first and second hoppers being spaced apart from each other along said base with said projection thereof disposed centrally between said first and second hoppers, each of said first and second hoppers having at least one stationary vertical flat inside wall-surface, said first and second hoppers having in their upper portion a first opening, and a second opening, respectively;
   (c) a pair of first and second levers pivotally mounted about fixed axis on said projection and interconnected at their free ends by a floating link;
   (d) a fluid-actuated cylinder having a piston rod pivotally connected to the free end of said first lever for moving both said first and second levers in timed relation to each other in opposite directions;
   (e) a first pick-up operatively connected to said first lever and responsive to pivotal movement thereof to vertically pivot for picking up certain fastener elements of one kind in said first hopper and then for discharging the picked-up fastener elements successively from said first opening;
   (f) a second pick-up operatively connected to said second lever and responsive to pivotal movement thereof to vertically pivot for picking up certain fastener elements of the other kind in said second hopper and then for discharging the picked-up fastener elements successively from said second opening; and
   (g) a pair of first and second chutes communicating with said first and second openings, respectively, for receiving therefrom the fastener elements of one kind and the fastener elements of the other kind and for delivering such two kinds of fastener elements separately to the fastener-assembling apparatus.

2. An apparatus according to claim 1, including:
(a) each said hopper including a pair of inner and outer guides mounted on said flat vertical inner wall surface for guiding a respective one of said first and second pick-ups;
(b) each said pick-up including an arm fixed to a respective one of said first and second levers and extending into a respective one of said first and second hoppers; and
(c) a fan-shaped plate mounted on a free end portion of said arm, each said fan-shaped plate having along its upper edge a stepped portion defining a groove extending along the entire length of said fan-shaped plate and opening laterally respectively to one of said stationary vertical flat inside wall surfaces, each said fan-shaped plate being movable in response to the pivotal movement of a respective one of said first and second levers, between a lowered position in which said stepped portion is disposed near a bottom of a respective one of said first and second hoppers to pick up the fastener elements, and a raised position in which said stepped portion is aligned with a respective one of said first and second openings, to discharge the picked-up fastener elements successively therefrom.

* * * * *